US012781684B2

(12) United States Patent
Matohara et al.

(10) Patent No.: US 12,781,684 B2
(45) Date of Patent: Nov. 3, 2026

(54) CONTROL DEVICE FOR INTERNAL COMBUSTION ENGINE

(71) Applicant: Hitachi Astemo, Ltd., Hitachinaka (JP)

(72) Inventors: Shinya Matohara, Hitachinaka (JP); Yoshihiko Akagi, Hitachinaka (JP); Kazuhiro Oryoji, Hitachinaka (JP); Hiroto Ishikawa, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 94 days.

(21) Appl. No.: 18/995,071

(22) PCT Filed: Jul. 20, 2022

(86) PCT No.: PCT/JP2022/028254
§ 371 (c)(1),
(2) Date: Jan. 15, 2025

(87) PCT Pub. No.: WO2024/018567
PCT Pub. Date: Jan. 25, 2024

(65) Prior Publication Data

US 2026/0243212 A1 Aug. 20, 2026

(51) Int. Cl.
*F02D 41/24* (2006.01)
*F02D 41/18* (2006.01)

(52) U.S. Cl.
CPC ....... *F02D 41/2432* (2013.01); *F02D 41/187* (2013.01); *F02D 2200/101* (2013.01); *F02D 2250/08* (2013.01)

(58) Field of Classification Search
CPC ............... F02D 41/2432; F02D 41/187; F02D 2200/101; F02D 2250/08
See application file for complete search history.

(56) References Cited

U.S. PATENT DOCUMENTS

| | | | | |
|---|---|---|---|---|
| 5,537,981 A * | 7/1996 | Suedholt | F02D 41/187 | 123/480 |
| 6,349,592 B1 * | 2/2002 | Hirasawa | G01F 1/6965 | 73/114.33 |

(Continued)

FOREIGN PATENT DOCUMENTS

| | | |
|---|---|---|
| EP | 0 575 635 A1 | 12/1993 |
| JP | 2014-20212 A | 2/2014 |
| JP | 2014020212 A * | 2/2014 |

OTHER PUBLICATIONS

International Search Report (PCT/ISA/210) issued in PCT Application No. PCT/JP2022/028254 dated Oct. 11, 2022 with English translation (7 pages).

(Continued)

*Primary Examiner* — Sizo B Vilakazi
(74) *Attorney, Agent, or Firm* — Crowell & Moring LLP

(57) ABSTRACT

The problem to be solved by the present invention is to obtain an internal combustion engine control device capable of appropriately correcting an output value of a flow rate sensor provided in an intake flow path of the internal combustion engine and reducing an error between a corrected air flow rate and an actual air flow rate. A control device (100) for an internal combustion engine (10) of the present invention includes a CPU (103) that computes an intake air amount of the internal combustion engine based on a sensor signal of an air flow sensor (12) provided in an intake passage (15), computes a pulsation rate from a pulsation amplitude and an average air amount of the intake air amount, and calculates a correction value for correcting a pulsation error of the intake air amount using the pulsation rate and an engine rotation speed of the internal combustion engine. A computation device includes an engine pulsation correction map (131), a blow-by pulsation correction map (132), and a criteria determination unit (133) that selects and (Continued)

uses one of these two correction maps for calculation of the correction value based on a parameter for determining an operation area of the internal combustion engine.

2 Claims, 9 Drawing Sheets

(56) References Cited

U.S. PATENT DOCUMENTS

| | | | | |
|---|---|---|---|---|
| 2020/0264023 | A1* | 8/2020 | Kitahara | G01F 1/72 |
| 2021/0148296 | A1* | 5/2021 | Hayashi | F02D 41/021 |
| 2021/0270202 | A1* | 9/2021 | Suzuki | F02D 41/222 |

OTHER PUBLICATIONS

Japanese-language Written Opinion (PCT/ISA/237) issued in PCT Application No. PCT/JP2022/028254 dated Oct. 11, 2022 with English translation (6 pages).

Extended European Search Report issued in European Application No. 22951954.1 dated Jul. 24, 2025 (7 pages).

* cited by examiner

CONTROL DEVICE FOR INTERNAL COMBUSTION ENGINE

TECHNICAL FIELD

The present invention relates to a control device for an internal combustion engine.

BACKGROUND ART

Conventionally, there is known an invention according to a control device for an internal combustion engine with an air flow sensor (Patent Literature 1). The control device of Patent Literature 1 includes an intake air amount calculation means, a pulsation amplitude ratio calculation means, a pulsation frequency calculation means, and a pulsation error calculation means. The intake air amount calculation means calculates an intake air amount based on an output value of the air flow sensor. The pulsation amplitude ratio calculation means calculates a pulsation amplitude ratio (pulsation rate) from a pulsation amplitude and an average air amount of the intake air amount. The pulsation frequency calculation means calculates a pulsation frequency associated with the rotation speed of the engine. The pulsation error calculation means calculates a correction amount of a pulsation error using the pulsation amplitude ratio and the pulsation frequency. The control device of Patent Literature 1 is characterized by correcting the intake air amount on the basis of the correction amount of the pulsation error.

That is, the control device of Patent Literature 1 first obtains a pulsation frequency from the engine rotation speed. Next, the control device obtains, from this pulsation frequency, a frequency response correction amount for correcting a frequency response of a hot-wire type air flow sensor. Next, the control device obtains, from this frequency response correction amount and an output value of the air flow sensor, a pulsation amplitude ratio. Then, the control device corrects the output value of the air flow sensor to obtain a final air amount using a pulsation error correction map composed of the pulsation frequency and the pulsation amplitude ratio.

CITATION LIST

Patent Literature

Patent Literature 1: JP 2014-20212 A

SUMMARY OF INVENTION

The control device for the internal combustion engine of Patent Literature 1, as stated above, corrects the output value of the air flow sensor on the basis of the pulsation amplitude ratio (pulsation rate) and the pulsation frequency (rotation speed). However, an intake pulsation includes not only an engine pulsation due to the blowback from a combustion chamber, but also a blow-by pulsation due to a pressure variation in a crankcase. When the intake air amount is corrected according to the pulsation rate, these pulsations may not be distinguished from each other, and an optimum correction value may not be applied.

The present invention has been made in view of the above issue, and provides a control device for an internal combustion engine, capable of appropriately correcting a sensor signal of an air flow sensor provided in an intake flow path of the internal combustion engine and reducing an error between a corrected air flow rate and an actual air flow rate.

Solution to Problem

A control device for an internal combustion engine according to the present invention comprises a computation device configured to compute an intake air amount of the internal combustion engine based on a sensor signal of an air flow sensor provided in an intake passage, compute a pulsation rate from a pulsation amplitude and an average air amount of the intake air amount, and calculate a correction value for correcting a pulsation error of the intake air amount using the pulsation rate and an engine rotation speed of the internal combustion engine. The computation device comprises: an engine pulsation error correction unit configured to correct a pulsation error of the intake air amount due to a blowback from a combustion chamber of the internal combustion engine; a blow-by pulsation error correction unit configured to correct a pulsation error of the intake air amount due to a pressure variation in a crank chamber of the internal combustion engine; and a criteria determination unit configured to select and use one of the engine pulsation error correction unit or the blow-by pulsation error correction unit for calculation of the correction value based on a parameter for determining an operation area of the internal combustion engine.

Advantageous Effects of Invention

According to the present invention, it is possible to reduce the error between the corrected air flow rate and the actual air flow rate. Further features relating to the present invention will become apparent from the following descriptions and the attached drawings. Other problems, configurations, and effects will become apparent from the following description of an embodiment.

DESCRIPTION OF EMBODIMENTS

Figure 1:
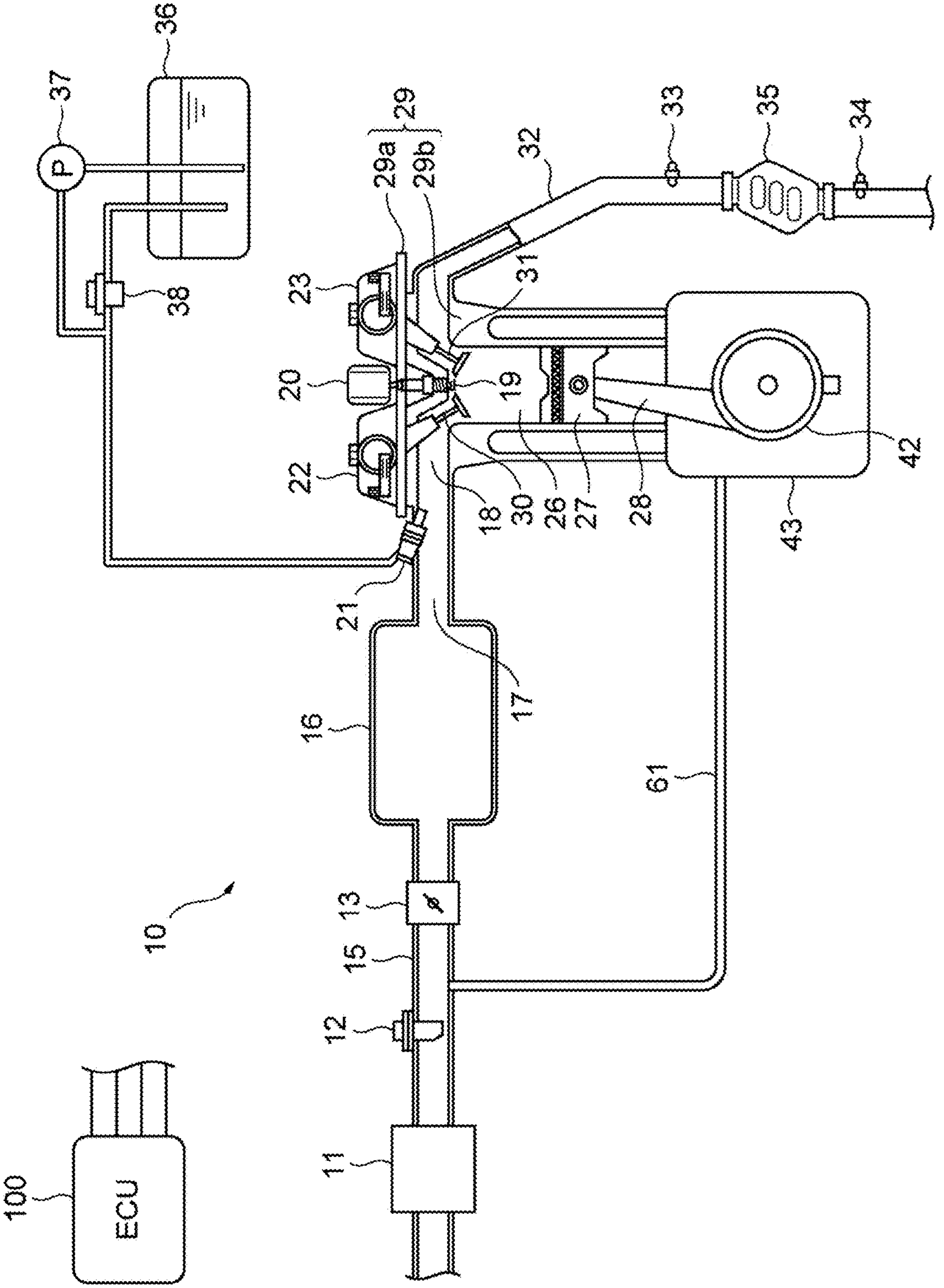
FIG. 1 schematically illustrates the overall configuration of an internal combustion engine to which an example of a control device for the internal combustion engine according to the present invention is applied.

Hereinafter, one embodiment of a control device for an internal combustion engine according to the present invention will be described in detail based on the drawings. FIG. 1 schematically illustrates the overall configuration of the internal combustion engine to which an example of the control device for the internal combustion engine according to the present invention is applied.

An internal combustion engine 10 of the present embodiment is an engine mounted on a vehicle such as an automobile, for example. The internal combustion engine 10 is a spark-ignited, four-stroke, multi-cylinder engine with four cylinders, for example. The internal combustion engine 10 includes cylinders 29 made up of a cylinder head 29*a* and a cylinder block 29*b*, and a piston 27 slidably fitted into each of the cylinders 29. The piston 27 is coupled to a crankshaft 42 via a connecting rod 28. The crankshaft 42 is rotatably supported in a crankcase 43 located below the cylinder 29. A combustion chamber 26 including a ceiling portion having a predetermined shape is formed on the upper side of the piston 27. The combustion chamber 26 of each cylinder is provided with an ignition plug 19 to which an ignition signal supplied with a high voltage is sent from an ignition coil 20.

The combustion chamber 26 communicates with an intake passage 15 including an air cleaner 11, an electric throttle 13, a collector 16, an intake manifold 17, and an intake port 18, and the like. Air required for fuel combustion flows through the intake passage 15 and is sucked into the combustion chamber 26 of each cylinder via an intake valve 30 that is driven to open or close by an intake camshaft 22 disposed at the end of the intake port 18, which is a downstream end of the intake passage 15. The intake manifold 17 of the intake passage 15 is provided with an injector 21 that injects fuel toward the intake port 18, for each cylinder.

An air flow sensor 12 for detecting an intake air amount is provided downstream of the air cleaner 11 of the intake passage 15. The electric throttle (hereinafter this may be simply referred to as a throttle valve) 13 for controlling a throttle opening by electric control is disposed downstream of the air flow sensor 12. A blow-by gas passage 61 is coupled, at its one end, between the air flow sensor 12 and the electric throttle 13 of the intake passage 15. The other end of the blow-by gas passage 61, which is used to feed blow-by gas in the crankcase 43 to the intake passage 15, is coupled to a crank chamber of the crankcase 43.

A mixture of air sucked in through the intake passage 15 and fuel injected from the injector 21 is sucked into the combustion chamber 26 via the intake valve 30, and combusted by means of spark ignition by the ignition plug 19 coupled to the ignition coil 20. Then, an exhaust gas after combustion in the combustion chamber 26 is exhausted from the combustion chamber 26 via an exhaust valve 31 that is driven to open or close by an exhaust camshaft 23, and then discharged to the outside atmosphere through an exhaust passage 32 including an exhaust port, an exhaust manifold, an exhaust pipe, and the like (not illustrated).

Furthermore, a three-way catalyst 35 for purifying the exhaust gas, where platinum or palladium or the like is applied on a carrier such as alumina or ceria, is provided on the downstream side of the exhaust passage 32. On the upstream side of this catalyst 35, a linear air fuel ratio sensor 33 having an output characteristic linear to an air fuel ratio before the catalyst is provided. On the downstream side of the catalyst 35, an O2 sensor 34 that outputs a switching signal for determining whether an air fuel ratio after the catalyst is richer or leaner than a stoichiometric air fuel ratio (theoretical air fuel ratio) is provided.

The injector 21 disposed for each cylinder of the internal combustion engine 10 is coupled to a fuel tank 36. Fuel in the fuel tank 36 undergoes fuel pressure regulation to achieve a predetermined fuel pressure by a fuel supply mechanism that includes a fuel pump 37, a fuel pressure regulator 38, and the like before being supplied to the injector 21. The injector 21 to which fuel with the predetermined fuel pressure has been supplied is driven to open by a fuel injection pulse signal having a duty (pulse width: equivalent to valve opening time) depending on operating conditions, such as an engine load, supplied from an engine control unit (ECU) 100. The injector 21 is configured to inject the fuel in an amount corresponding to the valve opening time toward the intake port 18.

The ECU 100 is a control device for the internal combustion engine 10 and includes a microcomputer that performs various types of control for the internal combustion engine 10, for example, fuel injection control (air fuel ratio control) by the injector 21 and ignition timing control by the ignition plug 19.

Figure 2:
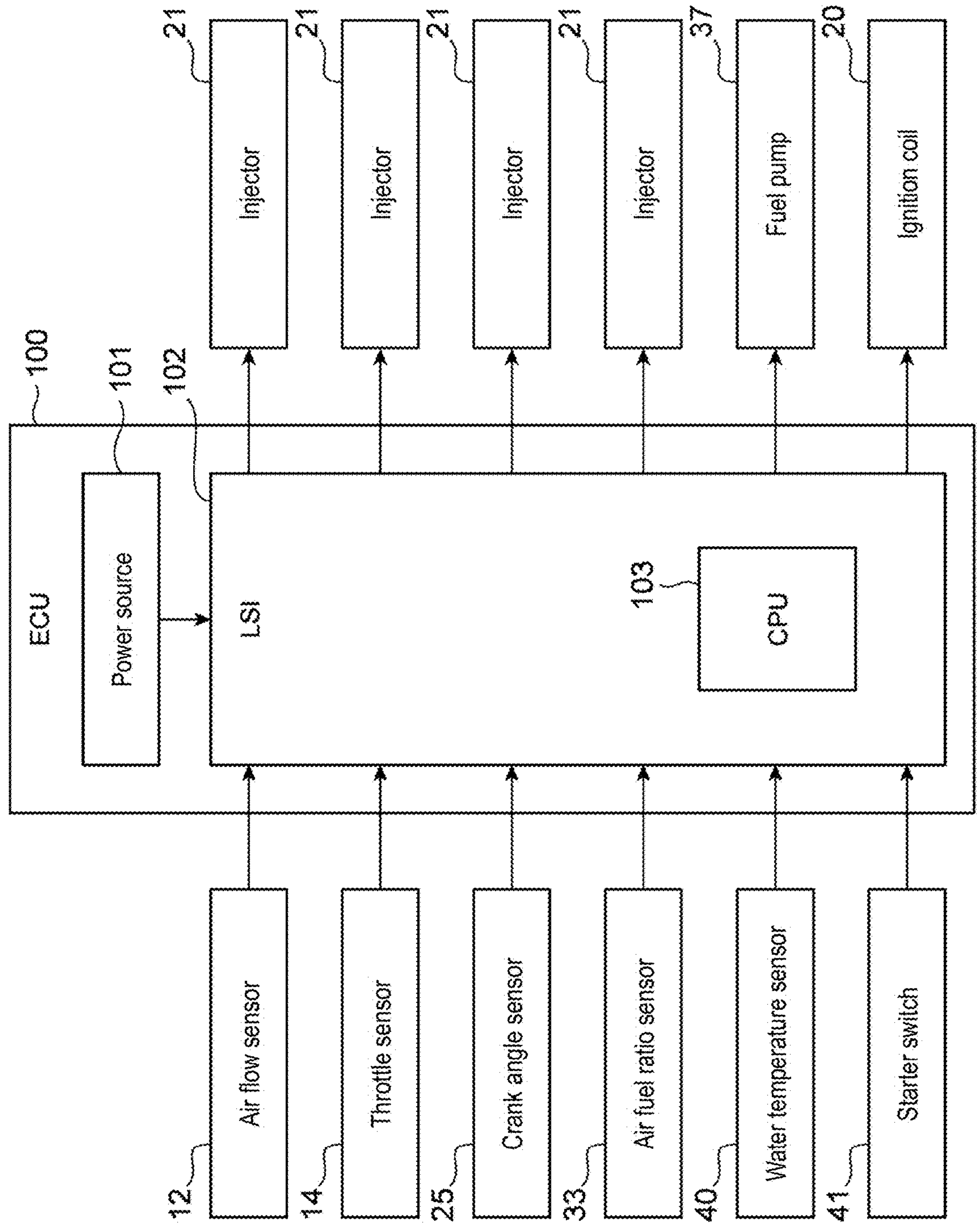
FIG. 2 illustrates the overall configuration of an ECU.

FIG. 2 illustrates the overall configuration of the ECU 100.

The ECU 100 includes a power IC 101 and a LSI 102, and a RESET terminal of the LSI 102 is connected to the power IC 101 so as to be able to transmit a RESET signal controlled by the power IC 101.

The ECU 100 receives signals from sensors required for controlling the internal combustion engine 10, for example, a crank angle sensor 25 for detecting an engine rotation speed, a water temperature sensor 40 for detecting a temperature of the cooling water of the internal combustion engine 10, a throttle sensor 14 for detecting a throttle opening of the throttle valve 13, the air fuel ratio sensor 33 for detecting an oxygen concentration in an exhaust gas, a starter switch 41, and the air flow sensor 12.

The detection signals from these sensors are input to the LSI (input process circuit) 102 in the ECU 100 and divided into signals detected by an A/D converter as an analog input and signals detected according to High/Low levels, and then processed. The LSI 102 includes a CPU 103 that is a computation device.

The CPU 103 has a function of executing a predetermined digital computation process according to a program stored in a storage means in the ECU 100, outputting control signals of various actuators required for controlling the internal combustion engine 10 based on a result of the computation, and controlling the various actuators via an output circuit of the LSI (input process circuit) 102.

For example, the CPU 103 performs the process of computing a mass flow rate measured from the detection signal of the air flow sensor 12, and a fuel injection amount by incorporating each correction amount including the rotation speed of the internal combustion engine 10 measured by the crank angle sensor 25 and the water temperature detected by the water temperature sensor 40, and a correction amount according to the state of the air fuel ratio detected by the air fuel ratio sensor 33, and finally performs the process of outputting a result of the computation as a drive pulse width to each of the injectors 21 of the internal combustion engine 10. Similarly, the CPU 103 also performs the process of outputting an ignition signal for controlling an energization timing to the ignition coil 20 required for combustion in the internal combustion engine 10, a signal to the electric throttle 13 for controlling the throttle opening, and the like.

The air flow sensor 12 includes a bridge circuit including a heating resistor, which is disposed in an air flow to be measured as a main component, such that the value of the current flowing in the heating resistor increases with an increasing intake air amount, whereas the value of the current flowing in the heating resistor decreases with a decreasing intake air amount. The air flow sensor 12 is a hot-wire type that extracts an intake air amount as a voltage signal by the current that flows through the heating resistor. Note that the voltage signal corresponding to the intake air amount is output as a voltage value, and is also converted to a frequency signal by conversion in a voltage-frequency conversion circuit, and the frequency signal is output.

The ECU 100 includes a storage means such as a ROM and a RAM. The storage means of the ECU 100 stores therein a correction map (pulsation error correction unit) for correcting a pulsation error of the intake air amount measured by the air flow sensor 12. The pulsation error is a deviation of an intake air amount Qa detected by the air flow sensor 12 from a true value Q of the intake air amount, and can be obtained by an expression (Qa−Q)/Q.

Figure 3:
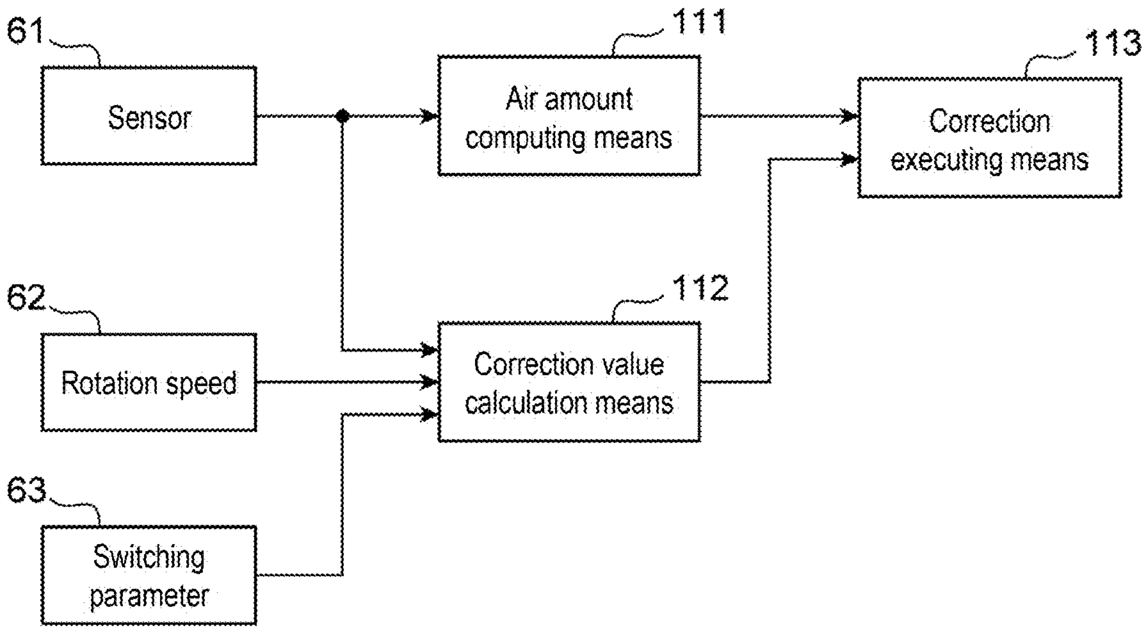
FIG. 3 is a functional block diagram of an intake air amount correction means.
Figure 4:
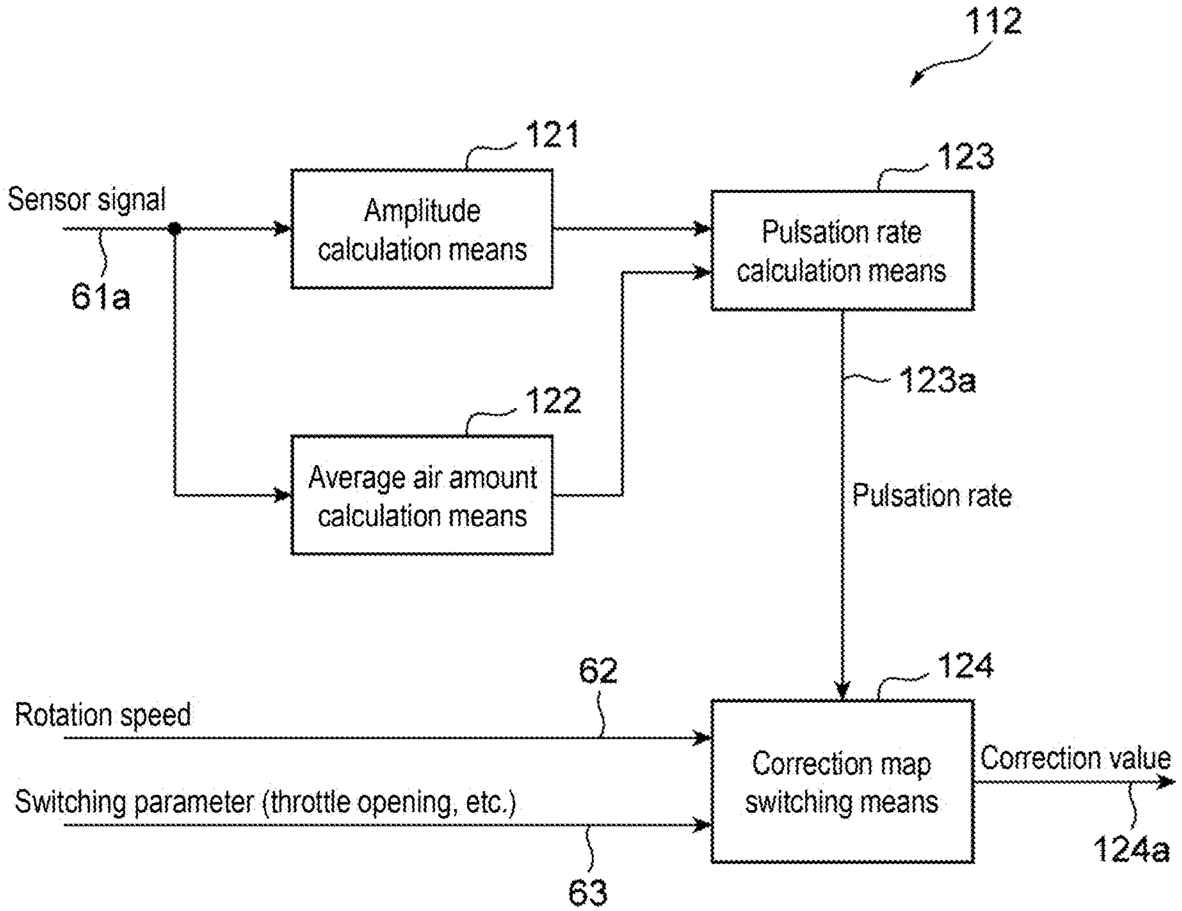
FIG. 4 is a functional block diagram of a correction value calculation means.
Figure 5:
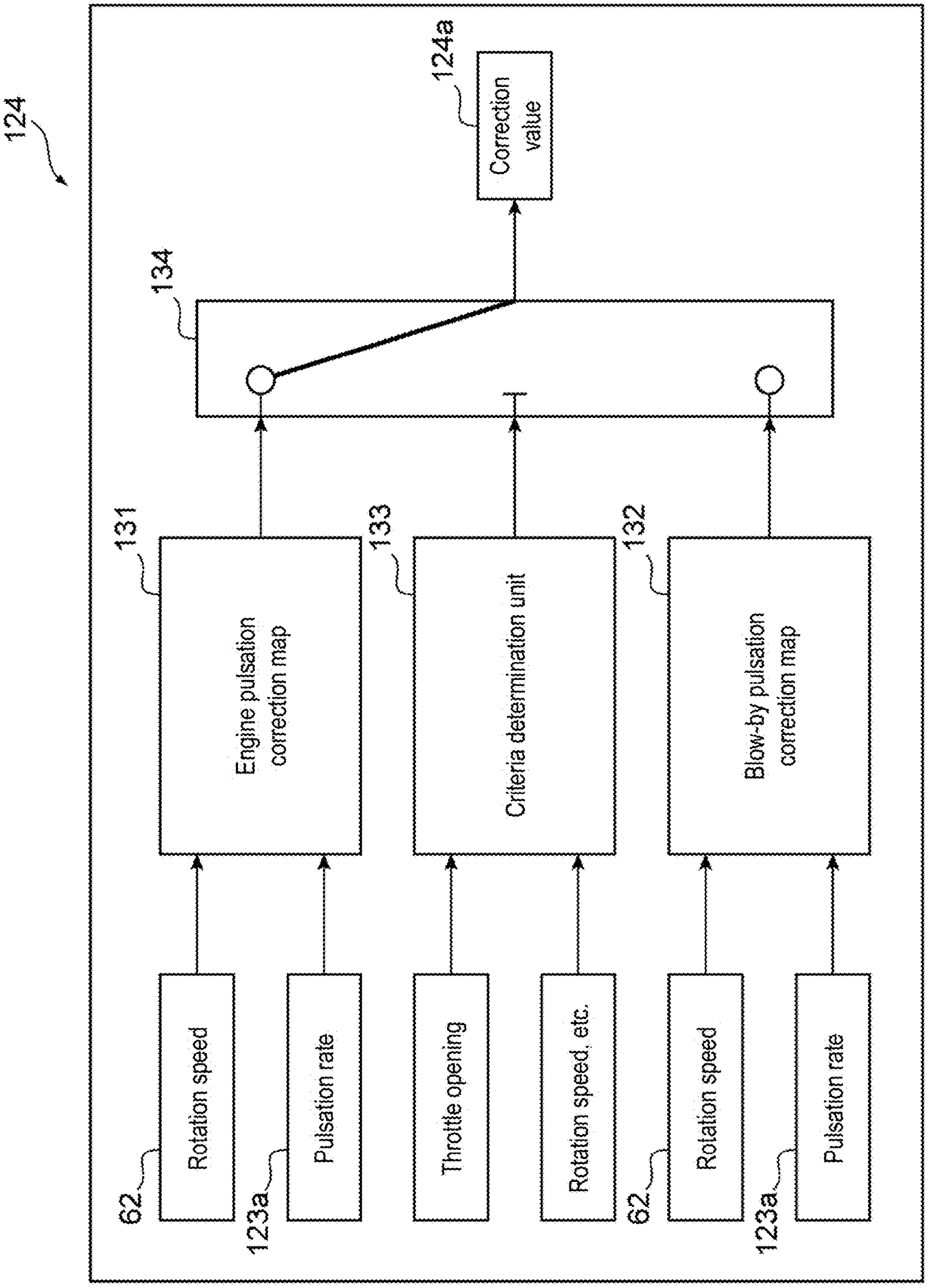
FIG. 5 is a functional block diagram of a correction map switching means.

Referring to FIG. 3 to FIG. 5, an example of a method of correcting a pulsation error of an intake air amount will be described. FIG. 3 to FIG. 5 schematically illustrate an internal process of an air amount computing method using an output signal of an air flow sensor when the method is executed by the ECU 100.

FIG. 3 is a functional block diagram of the intake air amount correction means.

As shown in FIG. 3, the ECU 100 includes an air amount computing means 111, a correction value calculation means 112, and a correction executing means 113, as an internal function to be embodied by executing a software program.

The air amount computing means 111 computes an intake air amount of intake air sucked into the internal combustion engine 10 on the basis of a sensor signal of the air flow sensor 12. The correction value calculation means 112 calculates a correction value for correcting an error included in the intake air amount computed on the basis of a sensor signal 61 of the air flow sensor 12. The correction value calculation means 112 calculates a correction value for correcting the error by referring to the correction map stored in advance in the memory of the ECU 100. The correction executing means 113 corrects an intake air amount computed by the air amount computing means 111 using the correction value calculated by the correction value calculation means 112. The ECU 100 computes a fuel injection amount using the intake air amount after corrected by the correction executing means 113.

FIG. 4 is a functional block diagram of the correction value calculation means.

The correction value calculation means 112 includes an amplitude calculation means 121, an average air amount calculation means 122, a pulsation rate calculation means 123, and a correction map switching means 124.

The amplitude calculation means 121 calculates an amplitude (pulsation amplitude) of the intake air amount on the basis of a sensor signal 61*a* of the air flow sensor 12. The average air amount calculation means 122 calculates an average air amount of the intake air amount on the basis of the sensor signal 61*a* of the air flow sensor 12. The pulsation rate calculation means 123 calculates a pulsation rate 123*a* using the amplitude and the average air amount of the intake air amount.

The correction map switching means 124 selects one of two correction maps stored in the memory of the ECU 100, and calculates a correction value by referring to the selected correction map. The correction map switching means 124 calculates a correction value 124*a* by referring to the correction map using an engine rotation speed 62 and the pulsation rate 123*a*.

FIG. 5 is a functional block diagram of the correction map switching means.

The correction map switching means 124 includes an engine pulsation correction map (engine pulsation error correction unit) 131, a blow-by pulsation correction map (blow-by pulsation error correction unit) 132, a criteria determination unit 133, and an output unit 134. The engine pulsation correction map 131 and the blow-by pulsation correction map 132 are stored in advance in the memory of the ECU 100. There are two types of pulsation that causes a pulsation error by the air flow sensor 12. The first type is an engine pulsation caused by a blowback from the combustion chamber reaching the air flow sensor 12, and the second type is a blow-by pulsation caused by a pressure variation in the crankcase reaching the air flow sensor 12 through the blow-by gas passage 61. The correction map switching means 124 includes the engine pulsation correction map 131 and the blow-by pulsation correction map 132 as the two correction maps that respectively correct the pulsation errors that occur by these two types of pulsation.

The engine pulsation correction map 131 is a map referred to for calculating a correction value for correcting the pulsation error (engine pulsation error) of the intake air amount due to the blowback from the combustion chamber 26 of the internal combustion engine 10. The engine pulsation error occurs when the intake air blows back into the intake passage 15 from the combustion chamber 26 of the internal combustion engine 10. The engine pulsation error is relatively small when the throttle opening of the throttle valve 13 is small or when the engine load of the internal combustion engine 10 is low. The engine pulsation error is relatively large when the throttle opening is large or when the engine load of the internal combustion engine 10 is high.

The blow-by pulsation correction map 132 is a map referred to for calculating a correction value for correcting the pulsation error (blow-by pulsation error) of the intake air amount due to the pressure variation in the crank chamber of the internal combustion engine 10. The blow-by pulsation error occurs when a blow-by gas in the crank chamber of the internal combustion engine 10 passes through the blow-by gas passage 61 and is supplied to the intake passage 15. The blow-by pulsation error is relatively large when the throttle opening of the throttle valve 13 is small or when the engine load of the internal combustion engine 10 is low. The blow-by pulsation error is relatively small when the throttle opening is large or when the engine load of the internal combustion engine 10 is high.

By referring to the engine pulsation correction map 131 and the blow-by pulsation correction map 132 with the engine rotation speed 62 that is the rotation speed of the crankshaft and the pulsation rate 123*a*, the correction value 124*a* of the intake air amount can be calculated.

The criteria determination unit 133 determines which correction map is to be used, the engine pulsation correction map 131 or the blow-by pulsation correction map 132, to calculate a correction value of the intake air amount. The criteria determination unit 133 performs determination on the basis of a parameter for determining an operation area of the internal combustion engine 10. The criteria determination unit 133 uses any one of the throttle opening of the throttle valve 13 provided in the intake passage 15, an idle determination result, a charging efficiency, or a vehicle speed, as the parameter for determining the operation area of the internal combustion engine 10.

The output unit 134 calculates the correction value 124*a* by referring to one of the correction maps, the engine pulsation correction map 131 or the blow-by pulsation correction map 132, selected by the criteria determination unit 133, and outputs the correction value 124*a* to the correction executing means 113.

Figure 6:
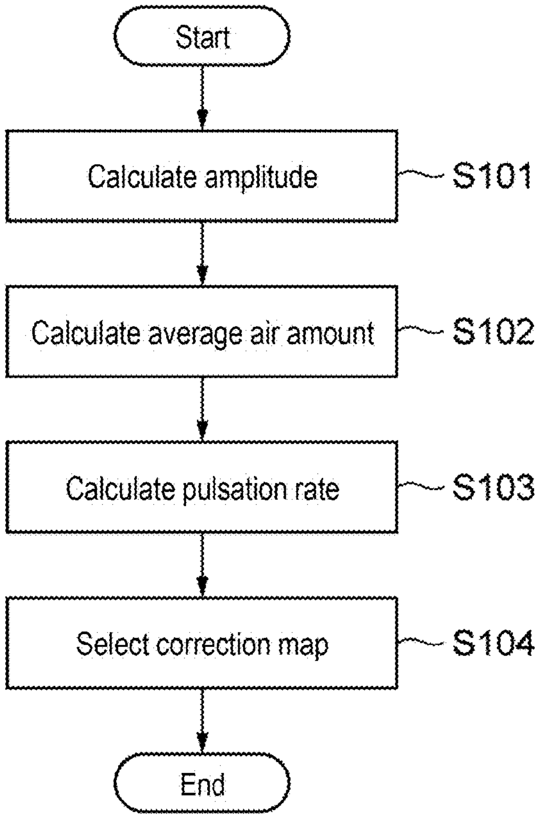
FIG. 6 is a flowchart describing a correction value calculation method.

FIG. 6 is a flowchart describing a correction value calculation method.

The correction value calculation means 112 stores and saves an intake air amount in a predetermined period, and calculates an amplitude and an average air amount of the intake air amount from the maximum air amount and the minimum air amount in the predetermined period (S101, S102). Next, the correction value calculation means 112 calculates a pulsation rate using the amplitude and the average air amount (S103). The pulsation rate 123*a* is used as an index indicating the magnitude of the pulsation, and is calculated by dividing the amplitude of the intake air by the average air amount (pulsation rate=amplitude/average air amount). Then, one of the engine pulsation correction map 131 or the blow-by pulsation correction map 132 is selected using the pulsation rate and the engine rotation speed (S104).

Figure 7:
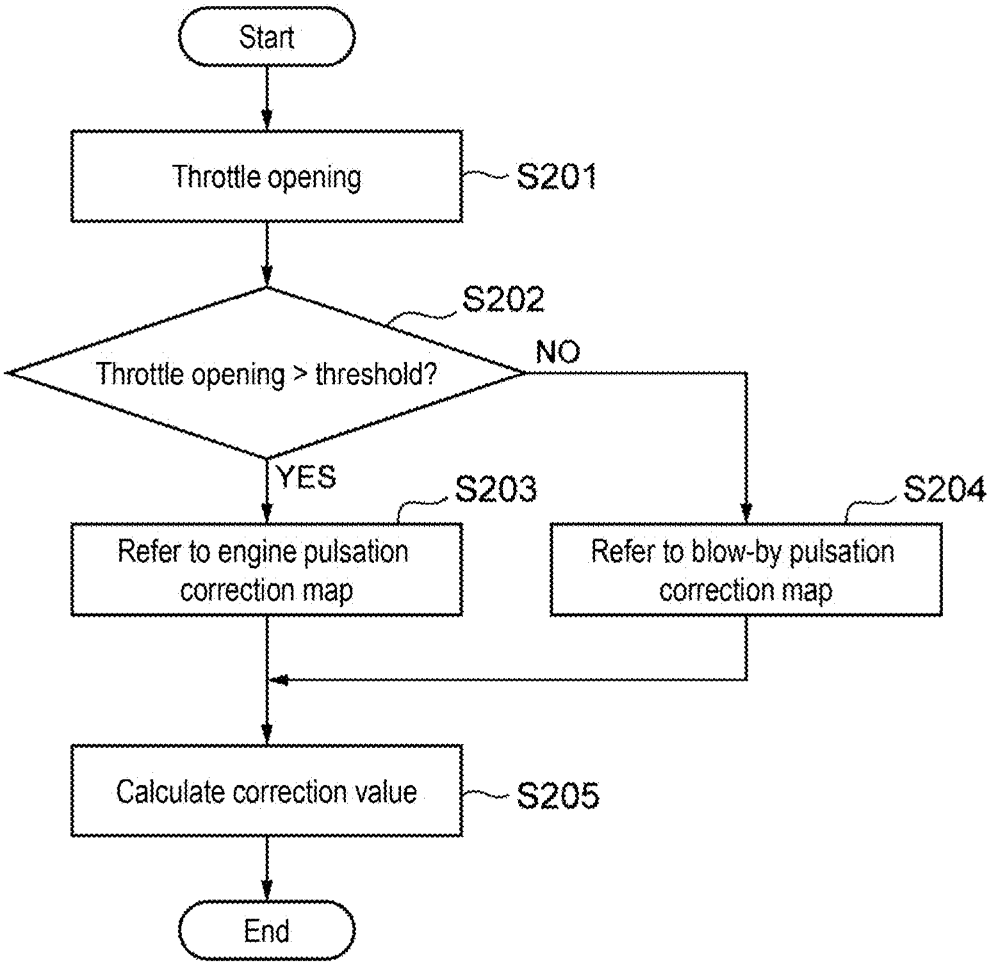
FIG. 7 is a flowchart describing an example of a correction map switching method.

FIG. 7 is a flowchart describing an example of a correction map switching method.

The correction map switching means 124 acquires data on the throttle opening from the electric throttle 13 (S201), and determines whether the throttle opening is larger than a threshold set in advance (S202). Here, if the throttle opening is larger than the threshold (YES at S202), reference to the engine pulsation correction map 131 is selected. Meanwhile, if the throttle opening is smaller than or equal to the threshold (NO at S202), reference to the blow-by pulsation correction map 132 is selected. Then, a correction value of the intake air amount is calculated using the selected correction map (S205).

Figure 8:
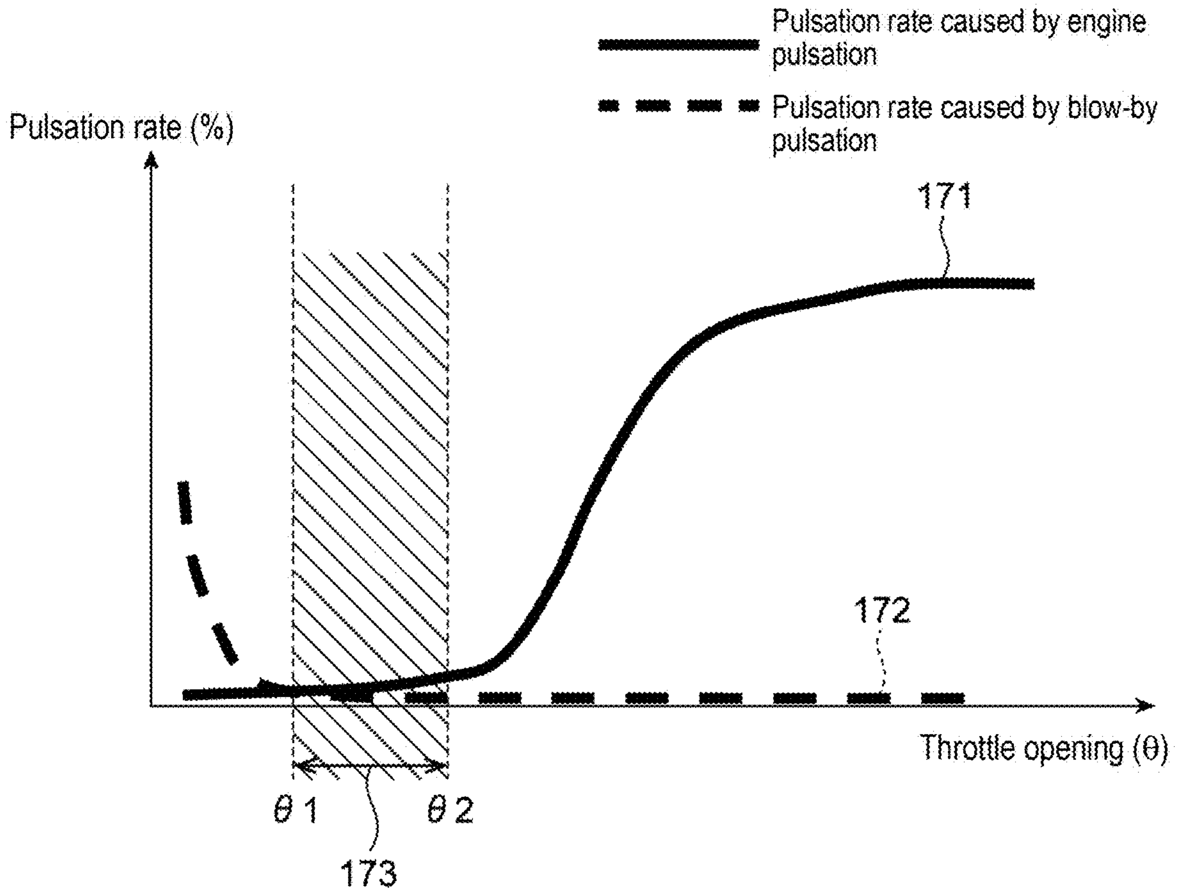
FIG. 8 is a chart depicting a relationship between a pulsation rate and a throttle opening.

FIG. 8 is a chart depicting a relationship between a pulsation rate and a throttle opening, and illustrates the features of the engine pulsation and the blow-by pulsation.

In the internal combustion engine 10, the throttle valve 13 is disposed between the air flow sensor 12 and the combustion chamber 26, and the intake air amount sucked into the combustion chamber 26 is adjusted by controlling the throttle opening of the throttle valve 13. When the throttle valve 13 is open, the opening area in the intake passage 15 is large, and thus the engine pulsation that occurs due to the blowback from the combustion chamber 26 is likely to reach the air flow sensor 12, thereby increasing the pulsation error of the air flow sensor 12. At this time, the throttle valve 13 is open largely, and thus the intake air amount in the intake passage 15 is large, and is substantially not affected by the blow-by pulsation.

In contrast, when the throttle valve 13 is in the closed position, the opening area in the intake passage 15 is small, and thus the pulsation that occurs due to the blowback from the combustion chamber 26 is less likely to reach the air flow sensor 12, thereby decreasing the engine pulsation. At this time, the throttle valve 13 is closed, and thus the intake air amount in the intake passage 15 is small, and is relatively largely affected by the blow-by pulsation. That is, it can be said that the influencing factor of the pulsation varies depending on the throttle opening.

Meanwhile, a throttle opening region (a hatched area in FIG. 8) 173 also exists, where the air flow sensor 12 is less likely to be affected by either of the pulsations. This throttle opening region 173 represents a situation in which the throttle opening is not open largely, but a certain amount of air is flowing. In this throttle opening region 173, the influence of the engine pulsation on the air flow sensor 12 is small since the opening area of the throttle valve 13 is small, and the influence of the blow-by pulsation on the air flow sensor 12 is also relatively small since the certain amount of air is flowing.

As shown in FIG. 8, a pulsation rate 171 caused by the engine pulsation is small when the throttle opening of the throttle valve is small, and increases with an increasing throttle opening. On the other hand, a pulsation rate 172 caused by the blow-by pulsation is large when the throttle opening of the throttle valve is small, and decreases with an increasing throttle opening.

This is because, as stated above, as the throttle opening increases, the blowback from the combustion chamber 26 is not prevented from reaching upstream (small pressure loss) and thus the influence of the engine pulsation on the air flow sensor 12 becomes large. In contrast, when the throttle opening is closed, the pressure loss at the throttle valve 13 becomes large, and thus the influence of the engine pulsation on the air flow sensor 12 becomes small, but the influence of the blow-by pulsation becomes relatively large since the absolute value of the amount of the flowing intake air becomes small.

Then, at the same throttle opening, an area where the engine pulsation occurs and an area where the blow-by pulsation occurs do not coexist. The throttle opening region 173 exists, as shown by the area between the throttle openings θ1 and θ2 in FIG. 8, where the influence of both of the pulsation rate 171 caused by the engine pulsation and the pulsation rate 172 caused by the blow-by pulsation is small.

In the present embodiment, the pulsation errors are separated into an error caused by the engine pulsation and an error caused by the blow-by pulsation, and the correction map to be used for correcting the pulsation error of the intake air amount is selected from one of the correction map for the engine pulsation or the correction map for the blow-by pulsation according to the throttle opening, and switched therebetween. This allows applying appropriate correction to each of the error caused by the engine pulsation and the error caused by the blow-by pulsation. Note that switching between the correction maps can be performed smoothly in the throttle opening region 173 by removing the step of the correction value.

Figure 9A:
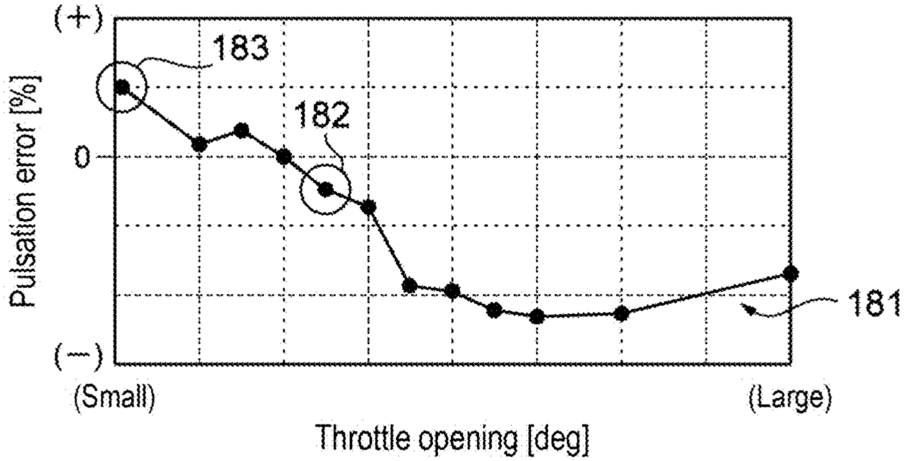
FIGS. 9A to 9C include charts depicting pulsation errors before and after correction in the present embodiment and a comparative example.
Figure 9B:
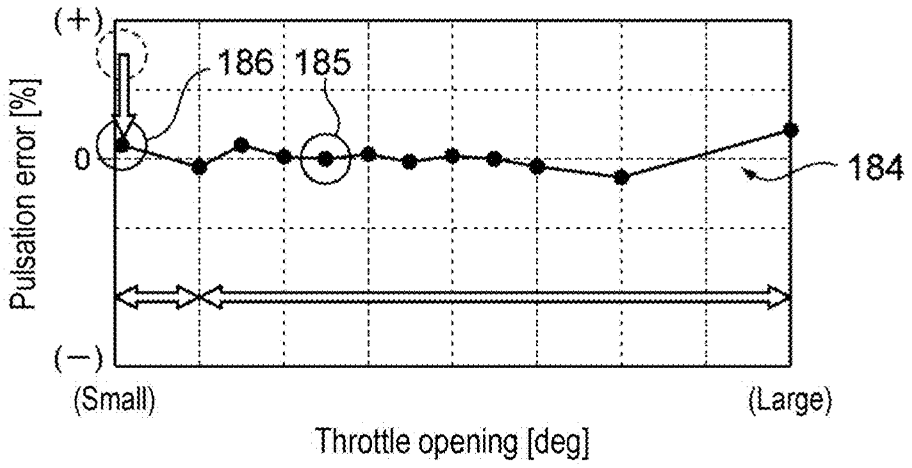
Figure 9C:
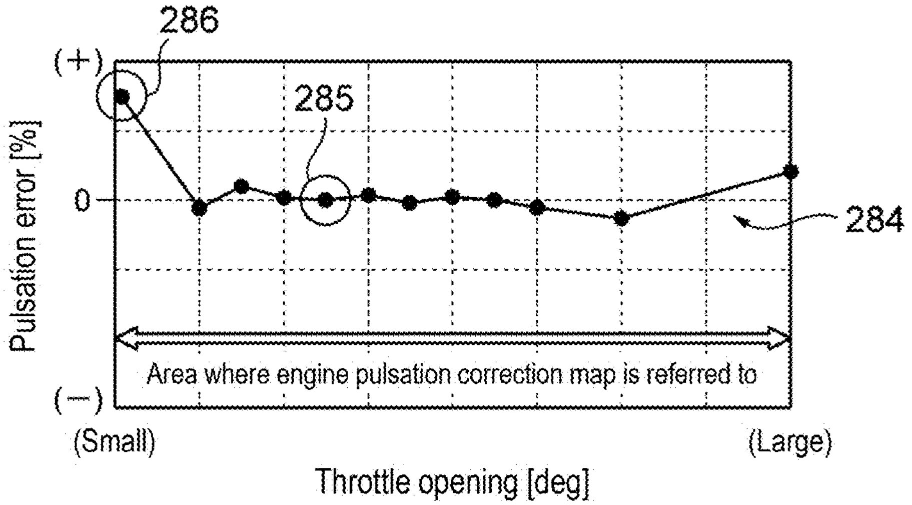

FIG. 9 includes charts depicting pulsation errors before and after correction in the present embodiment and a comparative example.

FIG. 9(1) is a chart 181 depicting a pulsation error before correction; FIG. 9(2) is a chart 184 depicting a corrected pulsation error after correction according to the configuration of the present embodiment; and FIG. 9(3) is a chart 284 depicting a corrected pulsation error after correction according to the configuration of the comparative example.

For example, the chart 181 depicting the pulsation error before correction is shown in FIG. 9(1). A pulsation error 182 and a pulsation error 183 in FIG. 9(1) are the same in terms of the pulsation rate, but are caused by different types of pulsation. The pulsation error 183 occurs on the positive side in the area where the throttle opening is small, whereas the pulsation error 182 occurs on the negative side in the area where the throttle opening is large.

The comparative example is shown in FIG. 9(3). In FIG. 9(3), the pulsation error is corrected using only the engine pulsation correction map. Thus, in the area where the throttle opening is large, the pulsation error 182 in FIG. 9(1) is corrected toward the positive side to obtain a pulsation error 285 having substantially an error of 0% in FIG. 9(3). Meanwhile, in the area where the throttle opening is small, the pulsation error 183 in FIG. 9(1) has the same pulsation rate as the pulsation error 182, and thus the same correction amount is applied. Therefore, the pulsation error 183 is corrected toward the positive side to become a pulsation error 286 in FIG. 9(3), and the error as corrected is larger than the error before correction.

In contrast, in the present embodiment, as shown in FIG. 9(2), in the area where the throttle opening is small, the pulsation error is corrected using the blow-by pulsation correction map instead of the engine pulsation correction map. Therefore, the pulsation error caused by the blow-by pulsation can be appropriately corrected, and consequently, also in the area where the throttle opening is small, the pulsation error 183 can be corrected to obtain a pulsation error 186 having an error of substantially around 0%.

In the foregoing present embodiment, the configuration of switching between the engine pulsation correction map and the blow-by pulsation correction map based on the throttle opening has been described. That is, in the described example, the throttle opening is used as the parameter for determining the operation area of the internal combustion engine 10, and the correction map is switched according to the throttle opening. However, the parameter for determining the operation area of the internal combustion engine 10 is not limited to the throttle opening, and for example, the engine load may be used, such as the idle determination result, the charging efficiency, or the vehicle speed.

The idle determination result is a result of determining whether the internal combustion engine 10 is in an idle state. For example, when the internal combustion engine 10 is not determined to be idle (non-idle state), it is deemed that the internal combustion engine 10 is under engine operation at an appropriate engine load, and thus is under the influence of the engine pulsation. Thus, the pulsation error is corrected using a correction value calculated using the engine pulsation correction map 131. Meanwhile, when the internal combustion engine 10 is determined to be idle (idle state), it is deemed that the internal combustion engine 10 is under engine operation at an extremely low load, and thus is under the influence of the blow-by pulsation. Thus, the pulsation error is corrected using a correction value calculated referring to the blow-by pulsation correction map 132.

When the charging efficiency is high, it is deemed that the internal combustion engine 10 is under operation at a high load, and thus the throttle opening is in the open position, and the internal combustion engine 10 is under the influence of the engine pulsation. Thus, the pulsation error is corrected using a correction value calculated referring to the engine pulsation correction map 131. Meanwhile, when the charging efficiency is low, the internal combustion engine 10 is under operation at a low load, and thus the throttle opening is in the closed position, and the internal combustion engine 10 is under the influence of the blow-by pulsation. Thus, the pulsation error is corrected using a correction value calculated referring to the blow-by pulsation correction map 132.

When the vehicle speed is high, it is deemed that the internal combustion engine 10 is under operation at a high load, and thus the throttle opening is in the open position, and the internal combustion engine 10 is under the influence of the engine pulsation. Thus, the pulsation error is corrected using a correction value calculated referring to the engine pulsation correction map 131. Meanwhile, when vehicle speed is low, the internal combustion engine 10 is under operation at a low load, and thus the throttle opening is in the closed position, and the internal combustion engine 10 is under the influence of the blow-by pulsation. Thus, the pulsation error is corrected using a correction value calculated referring to the blow-by pulsation correction map 132. Note that when the vehicle speed is low, the internal combustion engine 10 is in a full stop state or a low-speed traveling (slow-down) state by a creep phenomenon.

According to the present embodiment, one of the engine pulsation correction map or the blow-by pulsation correction map is selected on the basis of the throttle opening or the engine load that is the parameter for determining the operation area, and a correction value of the pulsation error is calculated. This allows applying correction according to each of the pulsation error caused by the engine pulsation and the pulsation error caused by the blow-by pulsation, and allows improving the measuring accuracy of the intake air amount. Therefore, it is possible to contribute to improving an EGR measuring accuracy, for example, and consequently to reduce an EGR margin, and to increase an EGR rate.

Although the embodiment of the present invention has been described in detail above, the present invention is not limited to the aforementioned embodiment, and various design changes are possible in so far as they are within the meaning of the present invention in the scope of the claims. For example, the aforementioned embodiment has been described in detail to clearly illustrate the present invention, and the present invention need not include all of the configurations described in the embodiment. It is possible to replace a configuration of an embodiment with a configuration of another embodiment, or to add, to a configuration of an embodiment, a configuration of another embodiment, to replace a configuration of an embodiment with a configuration of another embodiment. Further, it is also possible to, for a part of a configuration of each embodiment, add, remove, or substitute a configuration of another embodiment.

REFERENCE SIGNS LIST

10 Internal combustion engine
12 Air flow sensor
13 Throttle valve
15 Intake passage
26 Combustion chamber
100 ECU (control device)
102 CPU
111 Air amount computing means
112 Correction value calculation means
113 Correction executing means
121 Amplitude calculation means
122 Average air amount calculation means
123 Pulsation rate calculation means
124 Correction map switching means
131 Engine pulsation correction map (engine pulsation error correction unit)
132 Blow-by pulsation correction map (blow-by pulsation error correction unit)
133 Criteria determination unit
134 Output unit

The invention claimed is:

1. A control device for an internal combustion engine, comprising a computation device configured to compute an intake air amount of the internal combustion engine based on a sensor signal of an air flow sensor provided in an intake passage, compute a pulsation rate from a pulsation amplitude and an average air amount of the intake air amount, and calculate a correction value for correcting a pulsation error of the intake air amount using the pulsation rate and an engine rotation speed of the internal combustion engine, wherein the computation device comprises:

an engine pulsation error correction unit configured to correct a pulsation error of the intake air amount due to a blowback from a combustion chamber of the internal combustion engine;

a blow-by pulsation error correction unit configured to correct a pulsation error of the intake air amount due to a pressure variation in a crank chamber of the internal combustion engine; and a criteria determination unit configured to select and use one of the engine pulsation error correction unit or the blow-by pulsation error correction unit for calculation of the correction value based on a parameter for determining an operation area of the internal combustion engine.

2. The control device for the internal combustion engine according to claim 1, wherein the criteria determination unit uses, as the parameter for determining the operation area of the internal combustion engine, one of a throttle opening of a throttle valve provided in the intake passage, an idle determination result, a charging efficiency, or a vehicle speed.

* * * * *